Oct. 19, 1948.  W. R. WHEELER  2,451,597
ANNEALING OF CALENDERED THERMOPLASTIC MATERIAL
Filed Aug. 23, 1944  2 Sheets-Sheet 1
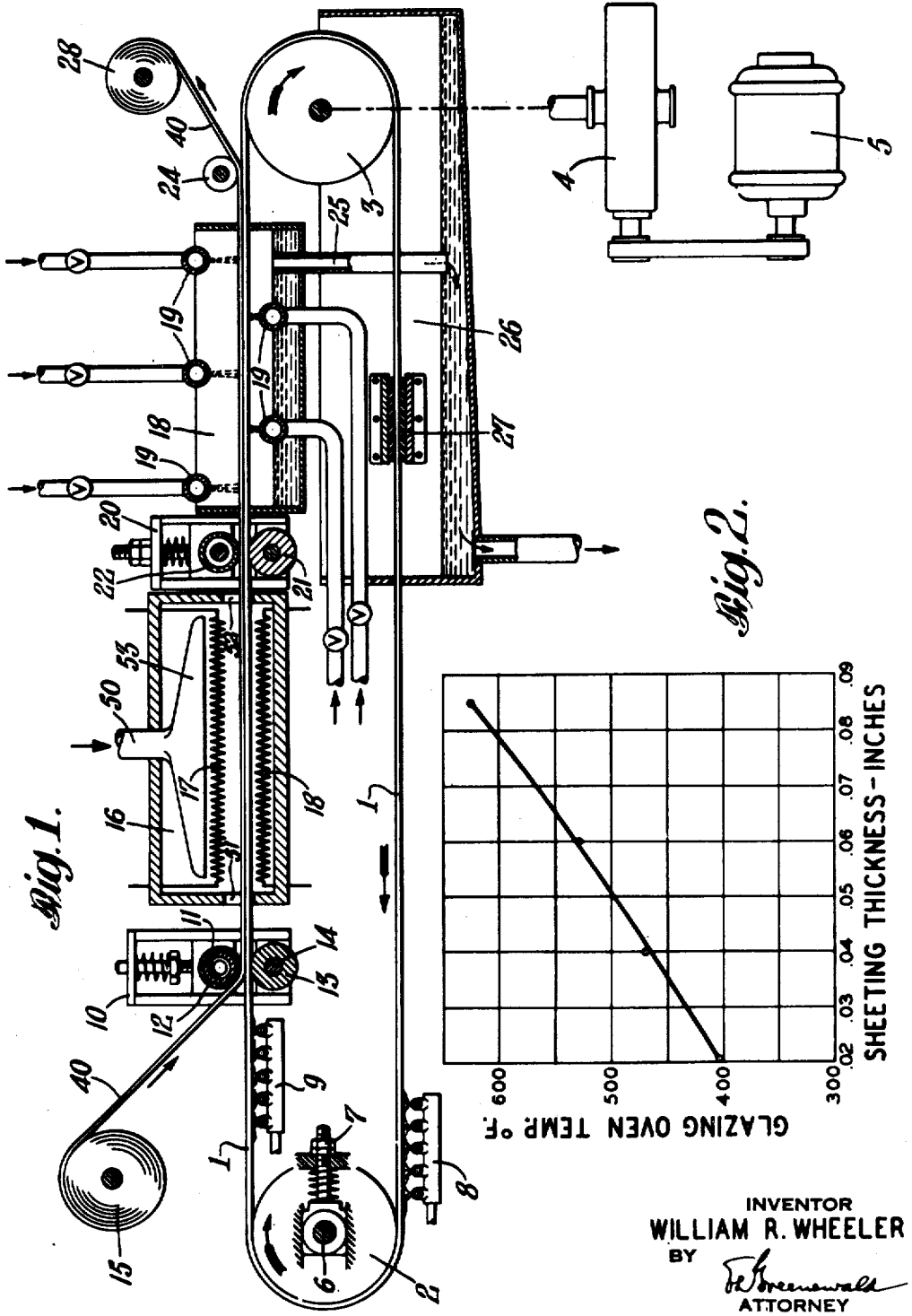
INVENTOR
WILLIAM R. WHEELER
BY
*Ge Greenewald*
ATTORNEY

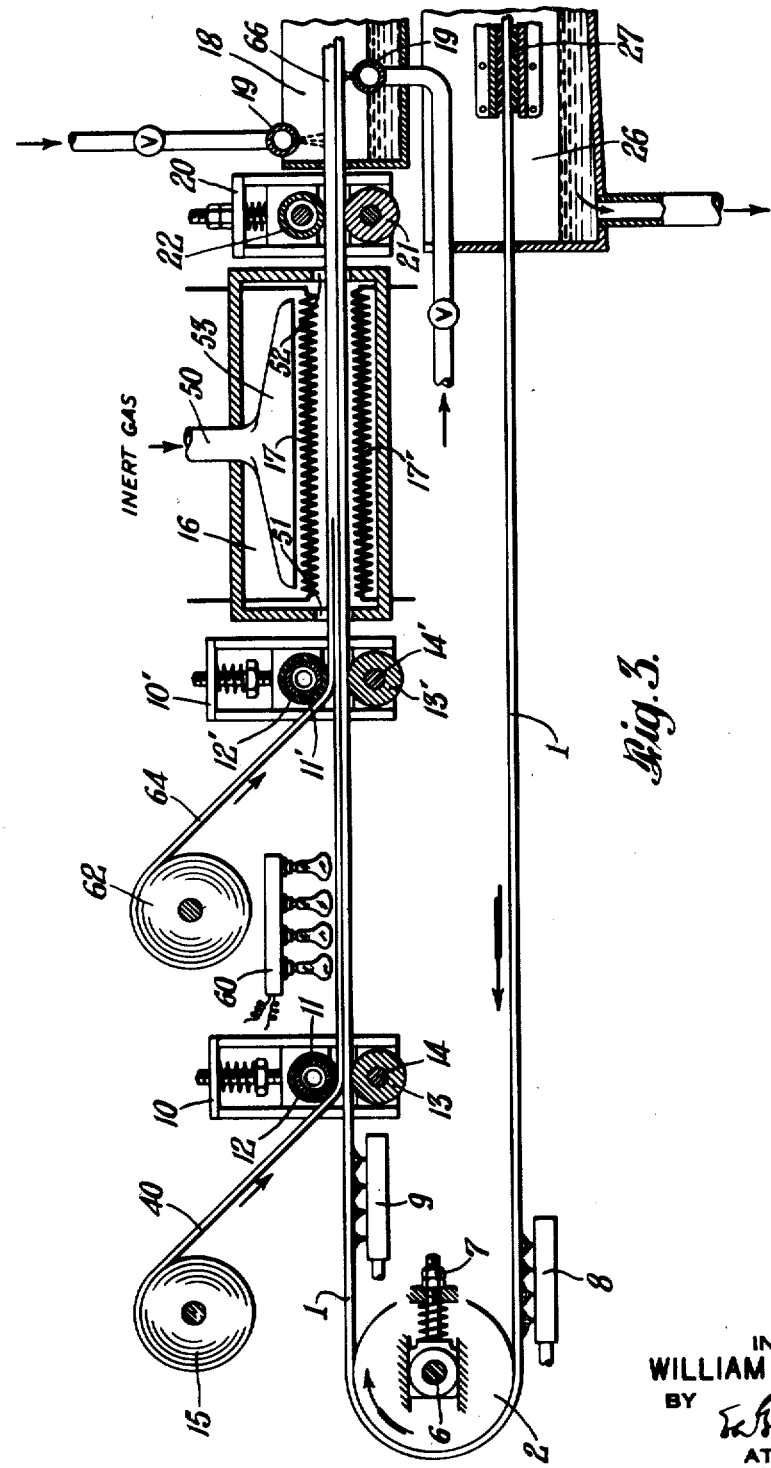

Patented Oct. 19, 1948

2,451,597

UNITED STATES PATENT OFFICE 2,451,597

ANNEALING OF CALENDERED THERMOPLASTIC MATERIAL

William R. Wheeler, Plainfield, N. J., assignor to Bakelite Corporation, a corporation of New Jersey Application August 23, 1944, Serial No. 550,837

21 Claims. (Cl. 18—48)

This invention relates to an annealing method and apparatus for the removal or reduction of internal stresses in thermoplastic resinous materials which have been shaped into continuous films, sheetings or webs by calendering or other forming operations requiring heat. The invention additionally contemplates the imparting of a smooth, glossy surface (like patent leather) or an embossed surface to the stress-relieved plastic.

The calendering of thermoplastic resinous material, such as vinyl type polymers and copolymers as well as other thermoplastic materials having properties suitable for calendering, is a relatively simple and economical forming operation, comprising essentially a masticating operation on the heat-softened plastic between the bite of the two upper rolls of a three-roll or four-roll calender revolving at equal or differential speeds and having equal or differential surface temperatures, then a transfer of the plastic film to a third or fourth roll, depending on the calender construction, from which the film is stripped off, cooled, and then wound on reels with or without liners, usually of paper, to prevent adhesion between the individual layers of plastic. In the preparation of calendered cloth, the cloth is coated or partially impregnated with thermoplastic material by introducing the cloth between the bite of the second and third or third and fourth rolls depending on calender construction; a surface coating of plastic with some slight impregnation into the cloth known as skim coating is obtained when these two rolls revolve at equal speeds, and a more thorough impregnation of the plastic into the cloth identified as frictioning when the third or bottom roll revolves at a slower speed than the middle roll whereby the plastic is actually kneaded and pressed into the fibers as well as into the fiber interstices.

Despite the fact that calendering operations are conducted at temperatures where the thermoplastic material is apparently in a plastic consistency, the behavior of the resultant calendered film indicates that an appreciable amount of deformation other than that attributable to plastic flow occurs while the material is being worked on the rolls. Immediate evidence of such deformation is observed when the calendered films, particularly of those resinous materials characterized by long molecular chains such as polyvinyl acetate, polyvinyl butyral, polyvinyl chloride, polyvinyl copolymers, polyethylene, polystyrene, masticated unvulcanized rubber, etc., are again exposed to elevated temperatures either approaching or above the temperature at which the film was formed in the calendering process, for the calendered films then measurably shrink, distort or buckle; these phenomena have been variously described as thermo-recovery, elastic after-effect or orientation, but basic to all is the presence of internal stresses which remain in a thermoplastic material that has been quickly cooled after being subjected to rapid deformation forces while at a temperature at which plastic flow occurs. Due to the rapid operation of the calendering rolls, it seems that whatever stresses are created in the material cannot be substantially eliminated before the film is discharged from the hot roll surface, since the dissipation of such stresses in many of the calendering materials requires an appreciable time period with the result that the stresses are practically frozen into the material as it rapidly cools to room temperature upon being stripped off the last roll. At room temperatures such stresses may in some instances be slowly dissipated in a period of days or months, but in doing so warpage, shrinkage and other undesirable distortion effects occur.

It has now been surprisingly found that thermoplastic material that has been calendered or otherwise shaped into sheets or as films on cloth or other base material can be relieved of substantially all internal stresses at a speed commensurate with that of the heat shaping operation. This is accomplished by pressing the calendered or otherwise heat shaped sheet or film having the stresses frozen therein onto a non-deformable surface at a high enough temperature to cause the adherence of the thermoplastic material thereto. The pressing is preferably accomplished by a squeezing or rolling action to bring the thermoplastic material into intimate and continuous contact with the non-deformable surface; the thermoplastic material then becomes so firmly secured to the surface, that it can be heated for a brief period to a temperature sufficiently elevated to relieve the plastic of stresses without causing any separation from the surface and consequently without change in dimensions or distortion. The temperatures for rapidly stress-relieving any particular thermoplastic material has been found to be dependent upon the temperature at which the material has been previously heat-shaped or formed, such as by calenders, extruders, and other heat-shaping or forming apparatus; the stress-relieving operation in the present process is conducted at temperatures above the forming temperature and below the decomposition temperature of the thermoplastic material, however the higher the temperature within this range the more rapidly the annealing is accomplished. The material after chilling can be readily stripped from the non-deformable surface without introducing new stresses or changes in shape. By having the non-deformable surface in the form of a metal belt mounted for continuous movement, a continuous length of the thermoplastic material can be stress-relieved and glazed without the necessity of severing the calendered material into short lengths. The speed of such continuous stress-relieving compares favorably with that of the calendering operation and so permits direct coupling of the stress-relieving apparatus to the calender rolls.

During the relatively short exposure to high temperatures, the thermoplastic film is relieved of substantially all stresses created therein by the calendering or other forming operation; and, since the material is in secure adhesive contact with the metal or other non-porous surface, no opportunity is afforded the thermoplastic film to distort, wrinkle or shrink during the stress-relieving period as would occur if the film were unsupported or merely laid on the hot belt without the positive pressure application. Upon completion of the stress-relieving cycle, the film, while still adhesively attached to the metal or other solid non-porous surface, is cooled to a non-plastic consistency, preferably by a spray of a non-solvent liquid such as water directed against the exposed plastic surface and the opposite side of the non-porous belt. The plastic, when cooled to a rigid or a non-plastic state, has then only a negligible adhesive attraction to most non-porous surfaces such as metal, glass or porcelain and is easily released therefrom by a pulling force insufficient to reintroduce new strains or stresses in the stress-relieved plastic. The stress-relieved plastic film so produced has a glossy attractive top surface in contrast to the usual dull or matte calender finish; and, if the metallic belt surface is highly polished, the under side of the plastic film that has been in contact with the metal surface will likewise have a smooth, glossy glaze. A further improvement to eliminate or substantially reduce any surface irregularities, such as graininess, pinholes, or wrinkles that may exist in the plastic film as calendered due to imperfections in calender roll surfaces or to poor calender processing technique, can be accomplished by subjecting the stress-relieved plastic immediately prior to cooling, to the smoothing or ironing action of a revolving metal pressure-roll maintained at a temperature low enough to avoid sticking of the hot plastic film to its surface. Such a roll can have a depressed or raised surface design whereby the plastic may be embossed with suitable designs.

An apparatus for carrying out the practice of the invention is illustrated in the accompanying drawing in which Fig. 1 is a longitudinal section of the apparatus; and Fig. 2 is a chart showing stress-relieving temperatures for films varying in thickness of the same thermoplastic material when treated for the same time periods in the apparatus shown in Fig. 1.

Fig. 3 is a longitudinal section of an apparatus similar to that shown in Fig. 1 but containing additional pressure members and heating means for laminating together and stress-relieving a plurality of thermoplastic sheetings.

The apparatus of Fig. 1 comprises a continuous metal belt 1, preferably having a smoothly ground and polished outer surface, that is tension mounted on an idler roll 2 and a driven roll 3 rotating in a clockwise direction by means of a connection through a speed reducer 4 to a prime mover as illustrated by an electric motor 5. The idler roll 2 is fixed upon a shaft 6 which is mounted in an adjustable spring loaded guide 7 in such manner as to maintain the metal belt 1 under sufficient tension to hold the belt 1 in a non-sagging position in its extension between the idler roll 2 and the driven roll 3.

Adjacent to and on each side of the idler roll 2 are belt-preheating means comprising gas burners 8 and 9 which are placed in close proximity to the metal belt 1. In place of the gas burners 8 and 9, an induction coil, infra red electric heating lamps, electrical resistance heaters, or steam heated platens may be substituted therefor; or the idler roll 2 can have a cored central passage through which steam or other heating fluid can be circulated. Whatever heating means is employed to heat the metal belt 1, it should be subject to precise temperature control to enable the maintenance of a constant predetermined temperature in the metal belt 1.

A frame 10, containing an adjustable pressure-applying idler roll 11 preferably having a peripheral surface 12 comprising an elastic material such as rubber, and in juxtaposition thereto another idler roll 13 on a fixed shaft 14, is mounted immediately adjacent to the belt heating means 9; the frame is so positioned that the metal belt 1 passes between the line contact of the idler rolls 11 and 13 without material deflection from its horizontal path. The fixed idler roll 13 can be cored for circulation of heating fluid therethrough to maintain the temperature of the metal belt 1, and the pressure applying idler roll can likewise be cored but for circulation of cooling fluid to avoid undue heating of the peripheral surface of rubber that may occur during long continuous operations.

From a feed roll 15 of calendered film of thermoplastic material, a continuous length 40 is drawn off and pressed onto the top surface of the heated metal belt 1 by the rubber-covered pressure-applying roll 11; the rubber surface is effective in supplying a broad pressure contact area to smoothly press the thermoplastic material into intimate contact against the heated metal belt 1 and prevent any entrapment of air between the thermoplastic film and the metal belt that may cause bubble-formation in the plastic by the expansion of the air when heated. The metal belt 1, with its superimposed layer of tightly adhering plastic material, then moves through an entrant opening 51 into a heated stress-relieving chamber 16 and departs through an exit opening 52. An electrical resistance heater 17 is mounted in chamber 16 above the metal belt 1. A second electrical resistance heater 17' is positioned within the chamber 16 underneath the metal belt and this heater 17' has a lower heating capacity than the upper heater 17. The lower heating means 17' is in operation only when the thickness of the thermoplastic material being treated is such that the upper heating means 17 fails to produce a stress-relieving temperature throughout the film thickness. In most instances the metal belt after being pre-heated by the gas burners 8 and 9 has sufficient sensible heat which in conjunction with the heating effect of the upper heater 17 is ample for heating the plastic throughout to a stress-relieving temperature. To prevent blister formation between the plastic and the metal belt which may occur when volatiles such as low boiling point plasticizers are present in the thermoplastic material, the heating effect of the individual electric heaters 17 and 17' are adjusted by rheostat controls (not shown) to provide for a higher heat intensity to be applied by the upper heater 17 in order that volatile matter is preferentially released from the exposed surface of the thermoplastic film. The length of the chamber 16 is dependent upon its heating capacity and the speed at which the plastic covered metal belt 1 travels through the chamber, since the plastic must be maintained at a stress-relieving temperature for a sufficient time interval to allow for the dissipation of the stresses. This time interval is relatively short for most thermoplastic materials, being of the order of less than 30 seconds for some of the vinyl polymers; for such a time interval, speeds up to 60 feet per minute can be secured with a chamber having an effective uniform temperature distance of about 22 feet. While heating of the plastic covered belt in the chamber 16 is illustrated by radiant energy means, conductive and convective means of heating and combinations thereof, such as electric induction heating of the conductive metal belt or electrostatic heating of the dielectric plastic layer by high frequency currents, are adaptable for this purpose.

The prevailing temperatures in the chamber 16 may at times be high enough to cause partial oxidation of some plastic materials or volatilization of plasticizer or other high boiling organic material in the thermoplastic material; in such instances an inert atmosphere is desirable within the chamber 16 to avoid the oxidation or the fire hazard of volatilized matter, especially when open electrical resistance heaters are employed. For this purpose an inlet pipe 50 is provided through which a constant stream of an inert gas, such as nitrogen, flows and is distributed into the chamber 16 by means of a funnel 53. The inert gas containing the volatilized matter given off by the thermoplastic film is vented through the entrant opening 51 and the exit opening 52 for the sheet material. Ordinarily the amount of plasticizer or other volatile matter given off by a thermoplastic material during the stress-relieving treatment is insufficient to materially alter the properties of the final film, such as pliability, flexural strength, tensile strength or elongation. In a continuous operation, however, sufficient volatile matter may gradually accumulate within the stress-relieving chamber to create a dangerous condition if means are not provided to create a non-inflammable atmosphere.

Placed immediately adjacent to the exit opening 52 of the chamber 16 is an adjustable pressure ironing mechanism 20, consisting of an idler roll 21 mounted on a fixed shaft, and an upper internally fluid cooled pressure-applying roll 22. The ironing roll 22 is mounted in such manner that the plastic covered belt 1 proceeds through the bite of the two rolls without substantial deflection from the straight line motion. The pressure-applying roll 22 is internally cooled to maintain the peripheral surface at a low enough temperature to prevent the hot plastic sticking to its surface. Preferably this roll 22 is positively driven to have a peripheral speed synchronous with the belt speed, rather than to rely on frictional contact with the plastic surface for rotational movement with possible slipping to mar the plastic surface.

Adjacent to the ironing mechanism 20 is a cooling chamber 18 in which nozzles 19 spray water or other non-solvent cooling fluid onto both sides of the metal belt 1. The velocity of the cooling fluid emerging from nozzles 19 is controlled by means of valves V so that the cooling fluid does not impinge on the hot thermoplastic surface with a velocity that causes marring of the thermoplastic surface before it has had an opportunity to cool to a non-plastic condition.

At the emergent end of the cooling chamber 18 and mounted outside thereof is an idler roll 24 revolving on a fixed shaft; it serves as a fixed fulcrum point of low friction value for stripping the stress-relieved plastic film from the surface of the metal belt. The film is then wound on a take-off roll 28.

The overflow of cooling water in the cooling chamber 18 flows through a pipe 25 to a collecting chamber 26 positioned underneath the cooling chamber 18 to receive, in addition to the overflow, the water dripping from the metal belt on its return circuit. A felt or rubber squeegee 27 is mounted within collecting chamber 26 to wipe off any adhering cooling water on the belt prior to its return for another application of thermoplastic material. It is essential that the belt be absolutely dry at the point where the calendered thermoplastic material is pressed onto its surface by the applicator rolls 12 and 13 to obtain good adherence and to avoid bubbles in the thermoplastic material due to conversion of the water into steam vapor by the heat in the stress-relieving chamber.

The invention is further described more specifically in the following examples; such examples, however, are not to be considered as limitations of the invention but as illustrations of the general technique for removing stresses from thermoplastic sheet material.

*Example 1*

A copolymer resin of about 9 mols of vinyl chloride and 1 mol of vinyl acetate, having an average molecular weight of about 24,000 as determined by Staudinger's method, was compounded with ethyl hexyl phthalate as a plasticizer to form a calendering composition containing 32 per cent by weight of plasticizer. This composition was calendered on hot rolls at an average temperature of 150° C. into a dull finish continuous calendered film 30 inches wide and 10 mils in thickness. The calendered film was then treated for stress removal in the aforedescribed apparatus by being pressed by the roll 12 onto the metal belt that had been initially heated to 210° C. The plastic attached to the belt was then passed through the stress-relieving chamber 16 at a speed which subjected the plastic to a temperature of 260° C. for 20 seconds before passing through the cooling chamber 18 to permit its stripping off from the metal belt. The film was highly glazed on both sides, and it was more transparent than the untreated calendered film. The extent of stress-removal was measured by determining the amount of shrinkage occurring in a sample piece of film freely suspended for 30 minutes in an oven held at 120° C., and then cooled to room temperature to be measured. The percentage amount of shrinkage under such test conditions of the stress-relieved material is shown in comparison with an untreated sample of the same calendered film.

|  | Shrinkage parallel to Calender Grain | Shrinkage perpendicular to Calender Grain |
|---|---|---|
|  | Per cent | Per cent |
| Untreated calendered film | 6.25 | 6.25 |
| Stress-relieved calendered film | 1.17 | 0.75 |

Example 2

A copolymer resin of about 9 mols of vinyl chloride and 1 mol of vinyl acetate having an average molecular weight of about 16,000 was directly hot-calendered at an average temperature of 135° C. without added plasticizer to form a dull translucent calendered sheeting 30 inches in width and 15 mils in thickness. The film was stress-relieved by being applied to the metal belt preheated to 125° C. and then subjected to a continuous temperature of 260° C. for 30 seconds before being cooled to room temperature by water sprays. The film as stripped from the belt was appreciably more transparent and had a higher luster on both surfaces than the untreated calendered film. Shrinkage tests as described in Example 1 but made at a temperature of 150° C. showed even more pronounced improvement as a result of this stress-relieving treatment.

|  | Shrinkage with Calendar Grain | Shrinkage across Calendar Grain |
|---|---|---|
|  | Percent |  |
| Untreated calendered film | 22.2 | (Specimens distorted by extension instead of contraction in this direction). |
| Stress-relieved calendered film | 0.19 | 0.23%. |

Example 3

The same copolymer resin employed in Example 2 was compounded in a Banbury with 2% of various coloring materials and then calendered at 135° C. Calendered sheeting of 15 mils thickness was then stress-relieved in the same apparatus and at the same temperature employed in Example 2. Shrinkage tests at 150° C. definitely proved the removal of stresses from the colored calendered film.

|  | Shrinkage with Calendar Grain | Shrinkage across Calendar Grain |
|---|---|---|
|  | Percent |  |
| Untreated calendered film | 41.3 | (Specimens distorted by extension instead of contraction in this direction). |
| Stress-relieved calendered film | 0.32 | 0.40%. |

The stress-relieved film was in a highly stable form, of pleasing luster, and had a considerably smoother surface than the untreated calendered film.

Example 4

A considerably thicker calendered sheeting having an average thickness of 60 mils was prepared by calendering at a roll temperature of about 150° C. the following composition which had been mixed together in a Banbury.

| | Per cent by weight |
|---|---|
| Copolymer vinyl chloride-vinyl acetate resin (average molecular weight 24,000) | 62.0 |
| Copolymer vinyl chloride acetate resin (average molecular weight 10,000) | 5.0 |
| Dibutyl tin dilaurate (stabilizer) | 1.5 |
| Cocoa butter wax | 1.5 |
| Ethyl hexyl phthalate | 30.0 |

The dull opaque calendered film was stress-relieved and glazed on both sides by being pressure applied to a polished moving belt having a temperature at the point of pressure application, between 250° to 260° C. and then exposed to a temperature of about 277° C. in the stress-relieving chamber, the belt speed being so adjusted that the plastic was subjected to this temperature for 21.5 seconds before emerging from the chamber. The hot plastic was ironed smooth by a water-cooled metal roll which applied a line pressure of 10 to 50 pounds per linear inch, the ironed plastic being then cooled by water sprays to a non-plastic consistency and subsequently rolled up on a take-off reel. The finished film had good surface luster on both sides, was translucent, and, when heated to a temperature of 150° C. for 15 minutes while freely suspended in an oven and then cooled to room temperature, showed linear dimensional changes of less than one per cent and was free of wrinkles or other form of distortion.

To determine the relationship between thickness of the calendered film and the prevailing temperature required in the chamber 16 to adequately stress-relieve within a constant exposure interval of 21.5 seconds, the calendering composition of Example 4 was calendered into films of varying thickness covering the range between 20 and 85 mils thickness; the relationship is shown by the chart of Fig. 2. It was found that with the use of radiant energy heating means in the stress-relieving chamber, that increasing temperatures were required as the thickness of the film increased as shown in Fig. 2, but surprisingly there was no pronounced deterioration or change in the physical properties of the stress-relieved plastic as might be expected from the higher temperatures to which the thicker sheetings were exposed. The results are shown in the following tabulation of physical tests:

| Film Thickness | Tensile, Lbs. per Sq. In. | Elongation, Per Cent | Heat [1] Stability Mins. at 135° C. | Olsen Stiffness In Lbs. ×10⁻⁴ | Fatigue Cycles at 25° C. |
|---|---|---|---|---|---|
| .020" calendered | 2,058 | 258 | 300+ | 23.7 |  |
| .020" stress relieved | 1,853 | 281 | 300+ | 24.7 |  |
| .040" calendered | 2,898 | 273 | 300+ | 164.0 | 233,462 |
| .040" stress relieved | 2,573 | 287 | 300+ | 197.0 | 225,489 |
| .060" calendered | 2,453 | 302 | 300+ |  |  |
| .060" stress relieved | 2,766 | 303 | 300+ |  |  |
| .085" calendered | 2,543 | 298 | 300+ |  |  |
| .085" stress relieved | 2,410 | 293 | 300+ |  |  |

[1] The "heat stability test" is an exposure test at elevated temperature for a period of at least five hours to determine the susceptibility of the thermoplastic material to decomposition as evidenced by a change from a normal water white color to a brown or black color.

Example 5

Coutil cloth was skim calendered on one side at 150° C. with an opaque calendering composition consisting of the following components:

| | Per cent by weight |
|---|---|
| Copolymer vinyl chloride-vinyl acetate resin (average molecular weight 24,000) | 54.6 |
| Copolymer vinyl chloride-vinyl acetate resin (average molecular weight 10,000) | 6.0 |
| Dibutyl tin dilaurate (stabilizer) | 1.5 |
| Cocoa butter wax | 1.0 |
| Ethyl hexyl phthalate | 30.0 |
| Dyes for coloring | 1.9 |

The coated coutil cloth had an average thickness of 30 mils, a dull surface finish, and when subjected to elevated temperatures approaching the calendering temperature wrinkled and buckled even though the textile backing retarded shrinkage of the plastic to some extent. By pressure-applying the coutil cloth with the plastic coating face down on a highly polished moving metal belt heated to 250° C., and then, while tightly adhering to the belt, exposing the plastic to a short stress-relieving treatment at 205° C. for 21.5 seconds, ironing the hot plastic calendered cloth with a water-cooled roll having a line pressure contact of 10 to 50 pounds per linear inch and subsequently cooling to room temperature before stripping off, the calendered cloth was rendered dimensionally stable and wrinkle free at elevated temperatures in addition to having a high surface luster on the exposed plastic surface.

The stress-relieving technique that has been illustrated with reference to vinyl chloride-vinyl acetate copolymer resins is directly applicable to other resinous thermoplastic materials capable of being calendered into continuous coherent films. The temperature at which stress-relieving takes place for any particular thermoplastic material is primarily dependent upon the temperature at which the material has been calendered or otherwise heat formed, and therefore it is selected at some value between the forming temperature and the decomposition temperature of the plastic. Operating at stress-relieving temperatures close to the decomposition point permits the most rapid treating cycles but care must be exercised when volatile plasticizers are present in the material to avoid an undue loss of them. To maintain adequate adhesion of the plastic to the hot metal belt whereby stress removal can occur without change of dimensional size of the plastic film, it is not necessary to eliminate the conventional lubricants such as oils, fats, waxes, and metallic soaps that are added in small amounts to calendering compositions to facilitate release from the rolls since it has been found that the lubricant does not significantly impair the adhesion of the plastic to the hot belt, but does assist in the stripping off operation when the stress-relieved plastic has been cooled to a temperature at which it is rigid or non-plastic.

Although the stress-relieving technique has been illustrated with reference to a mono-layer of thermoplastic film and to a thermoplastic film previously calendered onto a cloth backing, the technique and apparatus are adaptable to a laminating operation whereby two or more thermoplastic films can be laminated together under the single pressure applying means illustrated in Fig. 1 and then simultaneously heat-fused together and stress-relieved within a treating cycle substantially equivalent to a mono-layer of thermoplastic film of the same thickness as the laminated sheet. In a preferred modification of the apparatus for laminating purposes as shown in Fig. 3 it has been found more desirable to initially pressure-apply only one film 40 by means of pressure applying roll 11 to the heated belt 1 especially when the calendered films have a thickness exceeding 20 mils, and then permit this film to be heated enough to render its exposed top surface tacky by heating means such as a bank of infra red electric heating lamps 60, whereupon a second layer of thermoplastic film 64 from the supply roll 62 is pressure-applied on top of the heat-softened initial film by a second pressure applying means comprising a frame 10' in which is mounted an idler roll 13' rotating on a fixed shaft 14', and an adjustable pressure applying idler roll 11' having a peripheral surface 12' of rubber or other resilient material. The fixed idler roll 13' can be cored for circulation of heating fluid and the pressure applying idler roll 11' can be cored for circulation of cooling fluid. By such procedure no objectionable air interface will be created between the plastic layers to cause bubbles or delaminations when the laminated sheet 66 is exposed to the high temperatures in the stress-relieving chamber.

What is claimed is:

1. A method for removing stresses in thermoplastic materials that have been heat-formed into films, sheeting and the like, which comprises pressure-applying the thermoplastic materials onto a smooth solid surface heated to a temperature at which the thermoplastic material adheres, heating in the absence of pressure the thermoplastic material adhering onto the solid surface to a non-decomposing stress relieving temperature above the heat-forming temperature until the stresses have been substantially removed, cooling to a non-plastic condition and then stripping it from the solid surface.

2. A continuous method for removing stresses in thermoplastic materials that have been heat-formed into films, sheeting and the like, which comprises pressure-applying the thermoplastic material onto an endless moving metal belt heated to a temperature at which the thermoplastic material adheres, heating in the absence of pressure the thermoplastic material while adhering to the metal belt to a non-decomposing stress-relieving temperature and above the heat-forming temperature until the stresses have been substantially removed, cooling to a non-plastic condition and then stripping it from the metal belt.

3. A continuous method for removing stresses from thermoplastic material that have been heat-formed into films, sheeting and the like according to claim 2, which comprises stress-relieving the thermoplastic material in the presence of an inert atmosphere.

4. A continuous method for removing stresses and surface-polishing a calendered thermoplastic material which comprises pressure-applying the calendered thermoplastic material onto a moving endless metal belt heated to a temperature at which the thermoplastic adheres, heating the thermoplastic material in the absence of pressure while adhering to the metallic surface to a non-decomposing temperature above that at which it was calendered until a substantial amount of stress-release has occurred, smoothing the exposed surface of the hot thermoplastic material by rolling means maintained at a non-sticking temperature, cooling to a non-deformable condition and then stripping it from the metal belt.

5. A continuous method for removing stresses from calendered copolymer vinyl chloride-vinyl acetate resin film and sheeting which comprises pressure-applying the calendered material onto an endless moving metal belt heated to a temperature at which the material adheres, heating the material in the absence of pressure while adhering to the moving metal belt to a temperature between 400° F. and 650° F. until a substantial amount of stress-removal has occurred, cooling to a non-plastic condition and then stripping it from the metal belt.

6. A continuous method of removing stresses from plasticized copolymer vinyl chloride-vinyl acetate resin calendered into the form of films and sheetings which comprises pressure applying the plasticized material onto an endless moving metal belt heated to a temperature at which the material adheres thereto, then in the absence of applied pressure heating in an inert atmosphere the material while so adhering to the moving metal belt to a non-decomposing temperature above that at which it was calendered until a substantial amount of stress removal has occurred, then cooling to a non-plastic condition and then stripping it off the metal belt.

7. A continuous method for laminating together and stress-relieving thermoplastic material heat-formed into films, sheeting and the like, which comprises pressure-applying together two or more layers of the thermoplastic material onto an endless moving metal belt heated to a temperature at which the thermoplastic material adheres, heating the thermoplastic material in the absence of pressure while adhering to the metal belt to a non-decomposing strain-relieving temperature above the heat-forming temperature of the thermoplastic material until a substantial amount of stress removal has occurred, then cooling the laminated structure to a non-plastic condition and then stripping it from the metal belt.

8. A continuous method for laminating together and stress relieving thermoplastic material heat-formed into films, sheeting and the like, which comprises pressure-applying an initial layer of thermoplastic material onto an endless moving belt heated to a temperature at which the thermosplastic adheres, pressure-applying a succeeding layer on the exposed top surface of the preceding layer when it is heat-softened, exposing in the absence of pressure the pressure-consolidated layers while adhering to the metal belt to a non-decomposing stress-relieving temperature above the heat-forming temperature until a substantial amount of stress removal has occurred, cooling the laminated structure to a non-plastic condition and then stripping it from the metal belt.

9. A continuous method for removing stresses and for surface-glazing of textiles having a calendered coating of thermoplastic material which comprises pressure-applying the thermoplastic-coated side of the textile against a polished endless moving metal belt heated to a temperature at which the thermoplastic adheres, exposing in the absence of pressure the calender-coated textile material while adhering to the metal belt to a non-decomposing stress-relieving temperature above the calendering temperature until a substantial amount of stress removal has occurred, ironing the stress-relieved calendered textile material by rolling means maintained at a non-sticking temperature, cooling to a non-plastic condition and then stripping it from the metal belt.

10. A continuous method for removing stresses and for embossing calendered thermoplastic material which comprises pressure-applying the thermoplastic material against an endless moving metal belt heated to a temperature at which the plastic adheres, exposing the thermoplastic material in the absence of pressure while adhering to the metal belt to a non-decomposing strain-relieving temperature above the calendering temperature until a substantial amount of stress removal has occurred, embossing the stress-relieved thermoplastic material by rolling means maintained at a non-sticking temperature, cooling the embossed material to a non-plastic condition and then stripping it from the metal belt.

11. A method for relieving stresses in thermoplastic materials which have been heat-formed into films, sheeting and the like, which comprises preheating a non-porous surface of a solid to a temperature at which the thermoplastic material adheres thereto. pressure-applying the thermoplastic material onto the preheated surface, heating the thermoplastic material while adhering to the preheated surface and in the absence of applied pressure to a non-decomposing stress-relieving temperature above the temperature at which it had been heat-formed until the stresses have been substantially relieved, cooling the stress-relieved thermoplastic material until it is sufficiently rigid to be released from the surface of the solid, and stripping it from the surface.

12. A continuous method for relieving stresses in thermoplastic materials which have been heat-formed into films, sheeting and the like, which comprises pre-heating an endless moving metal belt to a temperature at which the thermoplastic material adheres thereto, pressure-applying the thermoplastic material onto the preheated moving belt, heating the thermoplastic material while adhering to the belt and in the absence of applied pressure to a non-decomposing stress-relieving temperature above the temperature at which it had been heat-formed until the stresses have been substantially relieved, cooling the stress-relieved material until it is sufficiently rigid to be released from the belt, and stripping the cooled thermoplastic material from the belt.

13. A continuous method for stress-relieving and glazing a heat-calendered thermoplastic material which comprises preheating the surface of an endless moving solid to a temperature at which the thermoplastic material adheres thereto, pressure-applying the calendered thermoplastic material onto the preheated moving solid surface, heating the material while adhering to the belt and in the absence of pressure to a non-decomposing temperature above that at which it had been calendered until the material has been substantially stress-relieved, cooling the stress-relieved material until it is sufficiently rigid to be released from the solid surface without introducing new strains, and stripping the cooled thermoplastic material from the solid surface.

14. A continuous method for stress-relieving copolymer vinyl chloride-vinyl acetate resin heat-formed into films, sheeting and the like, which comprises preheating the surface of an endless moving metal body to a temperature at which the thermoplastic material adheres thereto, pressure-applying the heat-formed copolymer resin onto the preheated moving metal surface, heating the resin while adhering to the metal surface and in the absence of applied pressure to a non-decomposing stress-relieving temperature above that at which it had been heat-formed until the resin has been substantially stress-relieved, cooling the stress-relieved resin until it is sufficiently rigid to be released from the metal surface, and stripping the cooled resin from the metal surface.

15. A continuous method for stress-relieving and polishing thermoplastic material heat-formed into films, sheeting and the like, which comprises preheating the surface of an endless moving metal body to a temperature at which the thermoplastic material adheres thereto, pressing the formed thermoplastic onto the preheated moving metal surface without entrapping air between the metal surface and the thermoplastic material, heating the thermoplastic material while adhering to the belt and in the absence of applied pressure to a non-decomposing stress-relieving temperature above that at which the thermoplastic material had been heat-formed until it has been substantially stress-relieved, cooling the stress-relieved material until it is rigid enough to be released from the metal surface without introducing new strains, and stripping the cooled material from the metal surface.

16. A continuous method for laminating together and stress-relieving thermoplastic materials heat-formed into films, sheeting and the like, which comprises preheating the surface of an endless moving metal body to a temperature at which the thermoplastic material adheres thereto, pressing an initial layer of the formed thermoplastic material onto the preheated moving metal surface, pressing and consolidating a succeeding layer of the thermoplastic material onto the first layer when its exposed surface has become tacky from heating, heating the pressure-consolidated layers in the absence of applied pressure to a non-decomposing stress-relieving temperature above the heat-forming temperature of the thermoplastic material until a substantial amount of stress-relieving has occurred and the individual layers have been heat-fused together into a laminated structure, cooling the laminated material until it is rigid enough to be released from the metal surface without introducing new strains, and stripping the cooled laminate from the metal surface.

17. A continuous method for relieving stresses from sheeting comprising a layer of textile material and a heat-formed layer of thermoplastic material, which comprises preheating the surface of an endless moving metal body to a temperature at which the thermoplastic material adheres thereto, pressure-applying the thermoplastic side of the sheeting onto the preheated moving metal surface, heating the sheeting in the absence of applied pressure and while adhering to the metal surface to a non-decomposing stress-relieving temperature above the heat forming temperature of the thermoplastic layer until a substantial amount of stress-relieving has occurred, cooling the sheeting until it is rigid enough to be released from the metal surface without introducing new strains, and stripping the cooled sheeting from the metal surface.

18. Method for applying thermoplastic material heat-formed into films, sheeting and the like onto a metal base and annealing the material while adhering to the metal base, which comprises preheating the surface of a metal base to a temperature at which the thermoplastic material adheres thereto, pressure applying the thermoplastic material onto the preheated surface, heating the thermoplastic material while adhering to the preheated surface and in the absence of applied pressure to a non-decomposing stress-relieving temperature above the temperature at which the material had been heat-formed until it has been substantially annealed, and then cooling the metal surface and annealed thermoplastic material to normal temperatures.

19. In an apparatus for removing stresses from thermoplastic material heat-formed into films, sheeting and the like, in combination, a frame, a pair of rolls mounted in spaced relationship on said frame, an endless belt passing around said spaced rolls with a horizontal upper run between said rolls, means for rotating one of said spaced rolls, preheating means associated with a section of said belt and capable of preheating said belt section to a temperature at which thermoplastic material will adhere thereto, an applicator roll associated with a further section of said belt subsequent to said preheating means for pressing thermoplastic material onto an outside surface section of the belt preheated by said preheating means, a second heating means associated with a section of the horizontal upper run of said belt free from any pressure applying means and beyond said applicator roll, said second heating means being capable of heating to annealing temperatures in the absence of applied pressure thermoplastic material adhering to the belt, cooling means associated with a section of the belt subsequent to said second heating means for cooling annealed thermoplastic material to a rigid state permitting its stripping from the metal belt, and stripping means for removing cooled thermoplastic material from the belt.

20. In an apparatus for removing stresses from thermoplastic material heat-formed into films, sheeting and the like, in combination, a frame, a pair of rolls mounted in spaced relationship on said frame, an endless metal belt passing around said spaced rolls with a horizontal upper run between said rolls, means for rotating one of said spaced rolls, preheating means associated with a section of said belt for preheating said belt section to a temperature at which thermoplastic material will adhere thereto, an applicator roll associated with a further section of said belt subsequent to said preheating means for pressing thermosplastic material onto an outside surface section of the belt preheated by said preheating means, a second heating means associated with a section of the horizontal upper run of the belt free from any pressure applying means and beyond said applicator roll, said second heating means being capable of heating to annealing temperatures in the absence of applied pressure thermoplastic material adhering to the belt, an ironing means for smoothing annealed thermoplastic material adhering to the belt, said ironing means being associated with a section of the belt subsequent to said second heating means, a cooling means associated with a section of the belt subsequent to said ironing means for cooling annealed and smoothed thermoplastic material to a rigid state permitting its stripping from the metal belt, and stripping means for removing cooled thermoplastic material from the belt.

21. In an apparatus for laminating together and annealing layers of thermoplastic material heat-formed into films, sheeting and the like, in combination, a frame, a pair of rolls mounted in spaced relationship on said frame, an endless metal belt passing around said spaced rolls with a horizontal upper run between said rolls, means for rotating one of said spaced rolls, preheating means associated with a section of said belt for preheating said belt section to a temperature at which thermoplastic material will adhere thereto, an applicator roll associated with a further section of said belt subsequent to said preheating means for pressing thermoplastic material onto an outside surface section of the belt preheated by said preheating means, a second heating means associated with a section of the belt subsequent to said applicator roll for heating to a tacky state the exposed surface of thermoplastic material pressed onto the belt by said applicator roll, a second applicator roll associated with a section of the belt subsequent to said second heating means for pressing thermoplastic material onto the tacky surface of the first applied thermoplastic material, a third heating means associated with a section of the horizontal upper run of the belt free from any pressure applying means and subsequent to said second applicator roll, said third heating means being capable of heating to laminating and annealing temperatures in the absence of applied pressure thermoplastic material adhering to the belt, cooling means associated with a section of the belt subsequent to said third heating means for cooling annealed thermoplastic material to a rigid state permitting its stripping from the metal belt, and stripping means for removing the cooled thermoplastic material from the belt.

WILLIAM R. WHEELER.

REFERENCES CITED

The following references are of record in the file of this patent:

UNITED STATES PATENTS

| Number | Name | Date |
|---|---|---|
| 986,162 | Gare | Mar. 7, 1911 |
| 1,949,175 | Netzel | Feb. 27, 1934 |
| 2,069,589 | Meijling et al. | Feb. 2, 1937 |
| 2,177,661 | Kimble | Oct. 31, 1939 |

Certificate of Correction

Patent No. 2,451,597.    October 19, 1948.

WILLIAM R. WHEELER

It is hereby certified that error appears in the printed specification of the above numbered patent requiring correction as follows:

Column 14, line 13, claim 19, after the word "endless" insert *metal*;

and that the said Letters Patent should be read with this correction therein that the same may conform to the record of the case in the Patent Office.

Signed and sealed this 15th day of February, A. D. 1949.

[SEAL]

THOMAS F. MURPHY,
*Assistant Commissioner of Patents.* a horizontal upper run between said rolls, means for rotating one of said spaced rolls, preheating means associated with a section of said belt for preheating said belt section to a temperature at which thermoplastic material will adhere thereto, an applicator roll associated with a further section of said belt subsequent to said preheating means for pressing thermoplastic material onto an outside surface section of the belt preheated by said preheating means, a second heating means associated with a section of the belt subsequent to said applicator roll for heating to a tacky state the exposed surface of thermoplastic material pressed onto the belt by said applicator roll, a second applicator roll associated with a section of the belt subsequent to said second heating means for pressing thermoplastic material onto the tacky surface of the first applied thermoplastic material, a third heating means associated with a section of the horizontal upper run of the belt free from any pressure applying means and subsequent to said second applicator roll, said third heating means being capable of heating to laminating and annealing temperatures in the absence of applied pressure thermoplastic material adhering to the belt, cooling means associated with a section of the belt subsequent to said third heating means for cooling annealed thermoplastic material to a rigid state permitting its stripping from the metal belt, and stripping means for removing the cooled thermoplastic material from the belt.

WILLIAM R. WHEELER.

REFERENCES CITED

The following references are of record in the file of this patent:

UNITED STATES PATENTS

| Number | Name | Date |
|---|---|---|
| 986,162 | Gare | Mar. 7, 1911 |
| 1,949,175 | Netzel | Feb. 27, 1934 |
| 2,069,589 | Meijling et al. | Feb. 2, 1937 |
| 2,177,661 | Kimble | Oct. 31, 1939 |

Certificate of Correction

Patent No. 2,451,597. October 19, 1948.

WILLIAM R. WHEELER

It is hereby certified that error appears in the printed specification of the above numbered patent requiring correction as follows:

Column 14, line 13, claim 19, after the word "endless" insert *metal*;

and that the said Letters Patent should be read with this correction therein that the same may conform to the record of the case in the Patent Office.

Signed and sealed this 15th day of February, A. D. 1949.

[SEAL]

THOMAS F. MURPHY,
*Assistant Commissioner of Patents.*